US006670913B1

(12) United States Patent
Talbot et al.

(10) Patent No.: US 6,670,913 B1
(45) Date of Patent: Dec. 30, 2003

(54) SELF-CALIBRATING ELECTRONIC DISTANCE MEASUREMENT INSTRUMENT

(75) Inventors: Nicholas C. Talbot, Ashburton (AU); Michael V. McCusker, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 479 days.

(21) Appl. No.: 09/163,286

(22) Filed: Sep. 29, 1998

Related U.S. Application Data

(63) Continuation-in-part of application No. 09/122,265, filed on Jul. 24, 1998, now abandoned.

(51) Int. Cl.[7] .............................. G01S 5/14; G01S 13/08
(52) U.S. Cl. ............................. 342/357.06; 342/357.17; 342/127
(58) Field of Search ..................... 342/127, 134, 342/174, 357.17, 357.14, 357.12, 357.06

(56) References Cited

U.S. PATENT DOCUMENTS

| 3,730,628 A | * | 5/1973 | Wolcott et al. ............. 342/134 |
| 5,233,357 A | | 8/1993 | Ingensand et al. .......... 342/352 |
| 5,430,537 A | * | 7/1995 | Liessner et al. ............ 356/5.1 |
| 5,471,218 A | | 11/1995 | Talbot et al. ............... 342/357 |
| 5,510,797 A | * | 4/1996 | Abraham et al. ........... 342/352 |
| 5,521,887 A | * | 5/1996 | Loomis ....................... 368/47 |
| 5,629,649 A | * | 5/1997 | Ujiie ........................... 331/25 |
| 5,708,439 A | * | 1/1998 | Lennen ....................... 342/352 |
| 5,717,402 A | * | 2/1998 | Chu ........................ 342/357.12 |
| 5,861,842 A | * | 1/1999 | Hitch et al. ................. 342/352 |
| 5,886,583 A | * | 3/1999 | Horiuchi ...................... 331/25 |

OTHER PUBLICATIONS

Bullock et al, "Test Results and Analysis of a Low Cost Core GPS Receiver For Time Transfer Applications", 1997 IEEE International Frequency Control Symp.., pp. 314–322.*
Penrod, Bruce, Adaptive Temperature Compensation of GPS Disciplined Quartz and Rubidium Oscillators, 1996 IEEE International Frequency Control Symp., pp. 980–987.*
Osterdock et al, "Using a New GPS Frequency Reference in Frequency Calibration Operations", 1993 IEEE International Frequency Control Symp., pp. 33–39.*
J. M. Rueger, Electronic Distance Measurement An Introduction, Springer Verlag, fourth edition1996, pp.31–47.

* cited by examiner

*Primary Examiner*—Gregory C. Issing
(74) *Attorney, Agent, or Firm*—Thomas E. Schatzel; Law Offices of Thomas E. Schatzel, A Prof. Corp.

(57) ABSTRACT

A combined satellite positioning and electro-optical total station system includes a reference oscillator that provides local oscillator signals for a satellite navigation receiver and a precision frequency source for use by an electronic distance meter. When the satellite navigation receiver is locked onto and tracking orbiting navigation satellites, the highly precise cesium-rubidium clocks in the navigation satellite system can be used as standards to control the reference oscillator in the combined satellite positioning and electro-optical total station system. Baseline measurements made by the electronic distance meter are therefore not subject to mis-calibrations and drift as long as the satellite navigation receiver is locked onto and tracking the orbiting navigation satellites.

2 Claims, 5 Drawing Sheets

SELF-CALIBRATING ELECTRONIC DISTANCE MEASUREMENT INSTRUMENT

This application is a continuation-in-part of application (s) application number 09 122,265 filed on Jul. 24, 1998 now abandoned "and which designated the U.S."

BACKGROUND OF THE INVENTION

1. Field of the Invention

The present invention relates generally to surveying instruments, and more particularly to devices and methods for using reference signals from a satellite navigation receiver to automatically and precisely calibrate electronic distance measurement instruments, and for servo-driving the telescopes in electro-optical total stations. Such calibration specifically includes hardware techniques for aligning a reference clock or oscillator, and/or software techniques for measuring local clock and frequency offsets and then subtracting such offsets out in the final calculations.

2. Description of the Prior Art

Electronic distance measurement (EDM) equipment became commercially available after World War-II and has since become very important to the surveying, navigation and scientific communities. Since the introduction of EDM, the instrument size and power consumption have been reduced, and the precision and speed of measurement have been improved. Because the miniaturization of EDM equipment became possible, it made good sense to mount EDM's on theodolites which have telescopes that can precisely sight a horizontal and vertical angle to a target. Such combinations are electro-optical hybrids called "total stations."

Combination electronic theodolite and EDM instruments allow surveyors to find the "space vector" from the instrument to a distant target. When a total station is connected to an electronic data recorder, field information can be quickly gathered and used to generate maps and plans in the office.

Flexible tapes, leveling staves, electro-optical distance meters, and other surveying equipment are calibrated to a legal standard and calibration certificates are issued, e.g., a "Regulation 80 Certificate," as is issued in Western Australia. Such calibration is especially important where a legal purpose is in mind, e.g., an inspection to enforce a law or to be used as evidence in a court action. A flexible tape calibration laboratory in Midland is registered by the National Standards Commission of Australia for calibration of 1–100 meter lengths.

There are two certified baselines in Western Australia against which EDM instruments can be calibrated. The aim of EDM calibration is to ensure that it measures in accordance with the internationally recognized definition of length, as set forth by the Conference Generale des Poids et Measures (CGPM—the General Conference on Weights and Measures). Other governments in the world provide similar baselines and certification opportunities. When a Regulation 80 Certificate is required for the purpose of legal traceability to the Australian Standard for length, the EDM instrument is submitted to the Surveyor General for calibration. The Director of the Mapping & Survey Division is the verifying authority for length and is appointed by the National Standards Commission. The Surveyor General now provides a software application program, called BASELINE, to assist surveyors with their regular calibrations of EDM instruments.

The accuracy of electronic distance measurement equipment is derived from an internal reference frequency source, e.g., a crystal oscillator. But such crystal oscillators can drift over time and with age. Exposure to extreme environments can also upset delicate calibrations of the reference frequency source, both short term and long term. Therefore, EDM equipment should be regularly calibrated by using it to measure a known length.

Long-range electronic distance meters, e.g., ranges over five kilometers, typically use microwave signals for measurement. Short range electronic distance meters often use infrared light. See, Rueger, J. M., Electronic Distance Measurement-An Introduction, Springer Verlag, Berlin, third edition, 1990. Both the long-range and short-range EDM's use pulse or phase comparison methods to determine the distance between instrument and a remote target. However, the phase comparison method is more commonly used for survey instruments.

The pulse technique is based on timing the signal travel time to and from a distant reflector. The velocity of the signal is assumed to be known. For phase comparison, the phase difference of signals is observed at several frequencies. The unambiguous distance between the target and the instrument is resolved using phase difference observations. But in all cases, the basis for measurement precision depends on the accuracy of the stand-alone reference frequency source.

One of the present inventors, Nicholas C. Talbot, described a combined satellite positioning/electro-optical total station system in U.S. Pat. No. 5,471,218, issued Nov. 28, 1995. One candidate satellite positioning system that can be used effectively is the Global Positioning System (GPS) operated by the United States. Such patent is incorporated herein by reference.

The combined satellite positioning/electro-optical total station system allows rapid instrument orientation and positioning in the field. Another integrated surveying system that combines electro-optical instrumentation with a satellite position measuring system is described by Ingensand, et al., in U.S. Pat. No. 5,233,357.

SUMMARY OF THE PRESENT INVENTION

It is therefore an object of the present invention to provide a combined satellite positioning and electro-optical total station system in which the electronic distance measurement is automatically and precisely calibrated.

It is another object of the present invention to provide a combined satellite positioning and electro-optical total station system that avoids duplicating components between its satellite positioning portion and its electro-optical total station portion.

Briefly, a combined satellite positioning and electro-optical total station system embodiment of the present invention includes a reference oscillator that provides local oscillator signals for a satellite navigation receiver and a precision frequency source for use by an electronic distance meter. When the satellite navigation receiver is locked onto and tracking orbiting navigation satellites, the highly precise cesium-rubidium clocks in the navigation satellite system can be used as standards to control the reference oscillator in the combined satellite positioning and electro-optical total station system. Baseline measurements made by the electronic distance meter are therefore not subject to miscalibrations and drift as long as the satellite navigation receiver is locked onto and tracking the orbiting navigation satellites.

An advantage of the present invention is that a combined satellite positioning and electro-optical total station system is provided that includes an electronic distance meter that remains automatically calibrated.

Another advantage of the present invention is that a combined satellite positioning and electro-optical total station system is provided that is less expensive to manufacture and maintain than the separate instruments it replaces.

These and other objects and advantages of the present invention will no doubt become obvious to those of ordinary skill in the art after having read the following detailed description of the preferred embodiment that is illustrated in the drawing figure.

IN THE DRAWINGS

DETAILED DESCRIPTION OF THE PREFERRED EMBODIMENT

Figure 1:
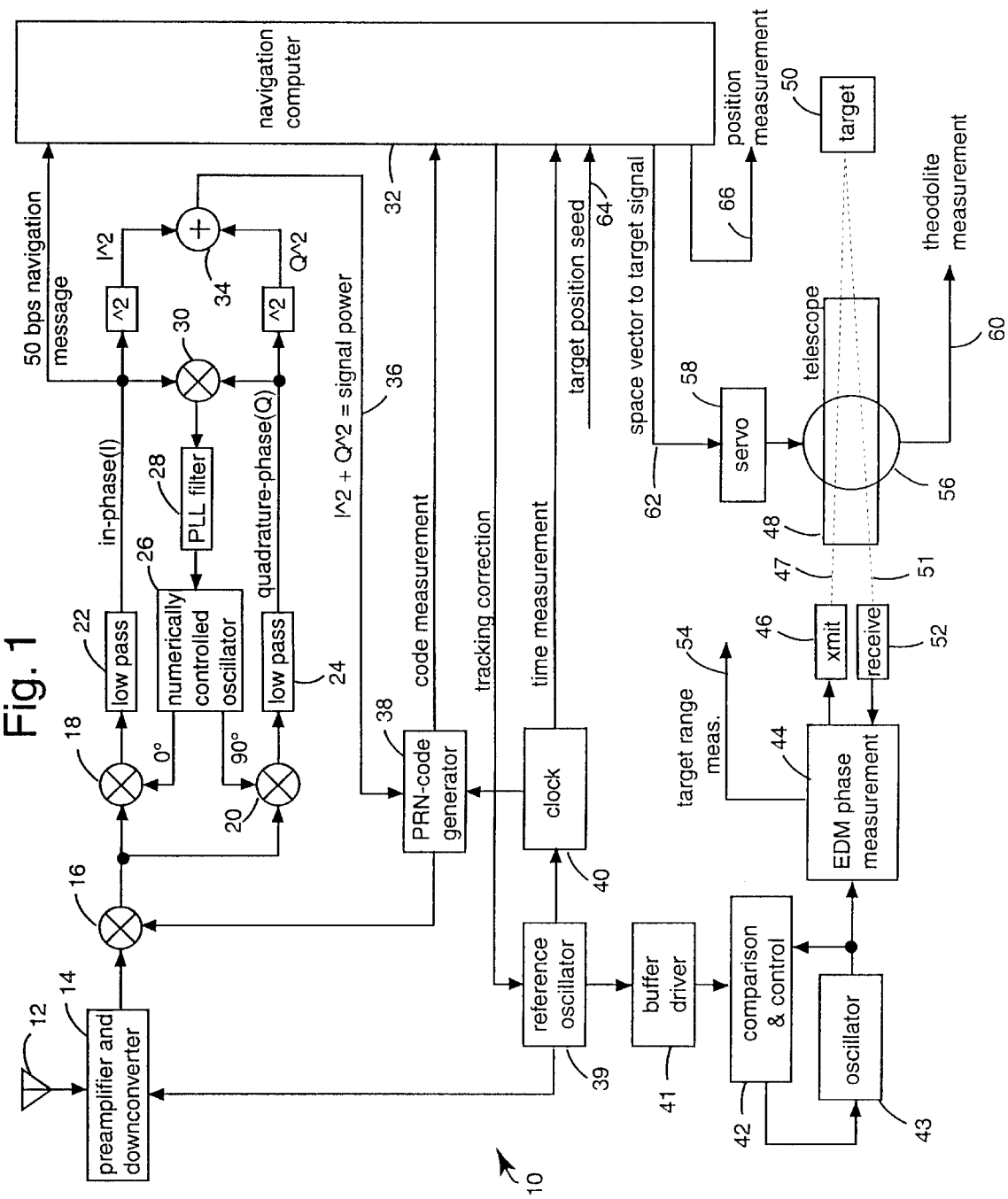
FIG. 1 is a functional block diagram of combined satellite positioning and electro-optical total station system embodiment of the present invention.

FIG. 1 illustrates a combined satellite positioning and electro-optical total station system embodiment of the present invention, referred to herein by the general reference numeral 10. A global positioning system (GPS) part of the system 10 includes a microwave patch antenna 12 for receiving L-band transmissions from orbiting GPS satellites, a preamplifier and downconverter 14, a code mixer 16, an in-phase carrier mixer 18, a quadrature phase carrier mixer 20. The carrier mixer outputs are each sent to low pass filters 22 and 24. A numerically controlled oscillator (NCO) 26 is driven by a bi-phase locked loop filter 28 and a multiplier 30. The NCO 26 produces a corrected frequency output that tracks the GPS-satellite carrier being tracked plus any Doppler effects.

The low pass filter 22 produces a fifty Hertz navigation message that is input to a navigation computer 32. An adder 34 combines a squared in-phase signal ($I^2$) and a squared quadrature-phase signal ($Q^2$) to produce a signal-power signal ($I^2+Q^2$) 36 that is proportional in magnitude to the despreading code, correlation. The $I^2+Q^2$ signal 36 is used to control the code-phase of a PRN-code generator 38. A GPS-master reference oscillator 39 receives correction signals from the navigation computer 32 that maintain the satellite tracking. A precision reference frequency is then made available to drive a clock 40 and the downconverter 14. A buffer driver 41 allows the reference frequency to be brought external from the GPS portion and isolates the reference oscillator from external load variations.

Figure 2:
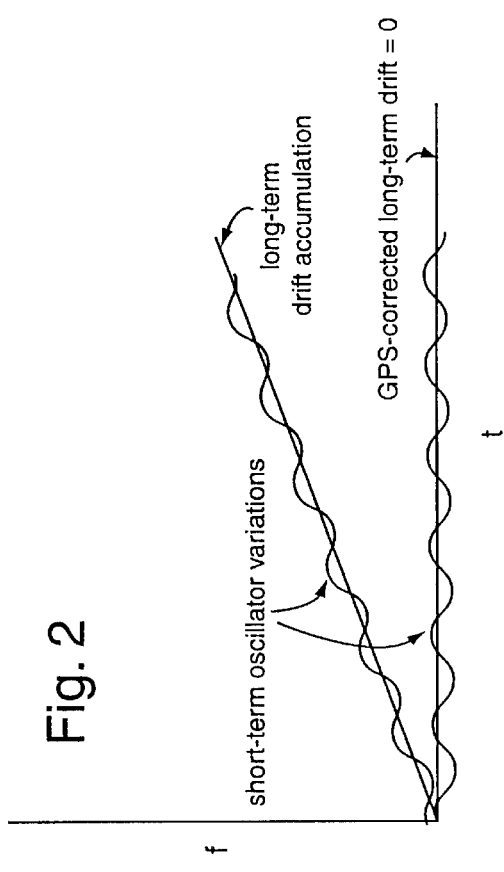
FIG. 2 represents a plot of short-term oscillator drift and the effect of the present invention to correct long-term oscillator drift.

FIG. 2 represents a plot of short-term oscillator drift and the effect of the present invention to correct long-term oscillator drift.

Referring again to FIG. 1, code measurement, time measurement, and the navigation message are used by the navigation computer 32 to compute the current three-dimensional position of the system 10. The GPS system time, e.g., in Universal Time Coordinated (UTC), is also determined by the navigation computer 32. Such UTC is typically accurate in absolute terms to better than one hundred nanoseconds. It is better than that on a relative basis, over a short term.

Once the location of the instrument station is determined either from GPS or other means, a minimum of only one satellite is required to calibrate the time base of the instrument.

An electronic distance meter (EDM) part of the system 10 includes a phase comparator and charge pump 42 that servo controls a slave oscillator 43. When the GPS navigation receiver part is tracking enough satellites to obtain a position fix, a highly accurate estimate of time and local oscillator frequency is available and used to precisely fix the operating frequency of oscillator 43. Inexpensive crystal oscillators can be used throughout and for the local oscillator in the GPS receiver, and their absolute frequency accuracy is relatively unimportant because once signal lock is obtained with the GPS satellites, phase locked loops can be used to establish a precision frequency reference that is almost as accurate as the cesium-rubidium clocks in the GPS system.

An EDM phase measurement subsystem 44 is connected to a transmitter 46 that sends an out-bound signal 47 through a telescope 48 to a distant target 50. The target 50 may include a prism corner-cube reflector, or active repeater for microwave EDM, to return an in-bound signal 51. The signals 47 and 51 may be infrared or other laser light, or microwave signals. The EDM phase measurement subsystem 44 can conduct either pulse time-of-flight or carrier phase measurements to determine the line-of-sight distance to the target 50. Conventional methods and equipment can be used to do this. A target range measurement 54 is output that can be presented on a local display, recorded electronically, or transmitted to a user that is at the target and is moving the target around to mark a particular range from the system 10 location.

A theodolite part of the system 10 includes the telescope 48 mounted to an angle measurement instrument 56 connected to a servo actuator 58. A theodolite measurement 60 includes an elevation and azimuth output that can be presented on a local display, recorded electronically, or transmitted to a user that is at the target 50 and is moving the target around to mark a particular vector angle from the system 10 location. A space vector to target signal 62 is computed by the navigation computer 32 from a target position seed input 64.

The navigation computer 32 is able to compute the current position of the system 10 and outputs this as a position estimate 66. From this position estimate, it is possible to determine the altitude and azimuth vector to the target 50. The space vector to target signal 62 commands the servo 58 to move the telescope 48 so that it is roughly pointed at the target 50. A conventional search and tracking mechanism can then be used to find and keep the target 50 locked in. For example, the Geodimeter SYSTEM-500 is a commercially marketed system that is a servo-driven survey instrument in an automatically pointed electro-optical total station. The target location seed can be computed using differential satellite position calculations relative to the EDM reference station.

Figure 3:
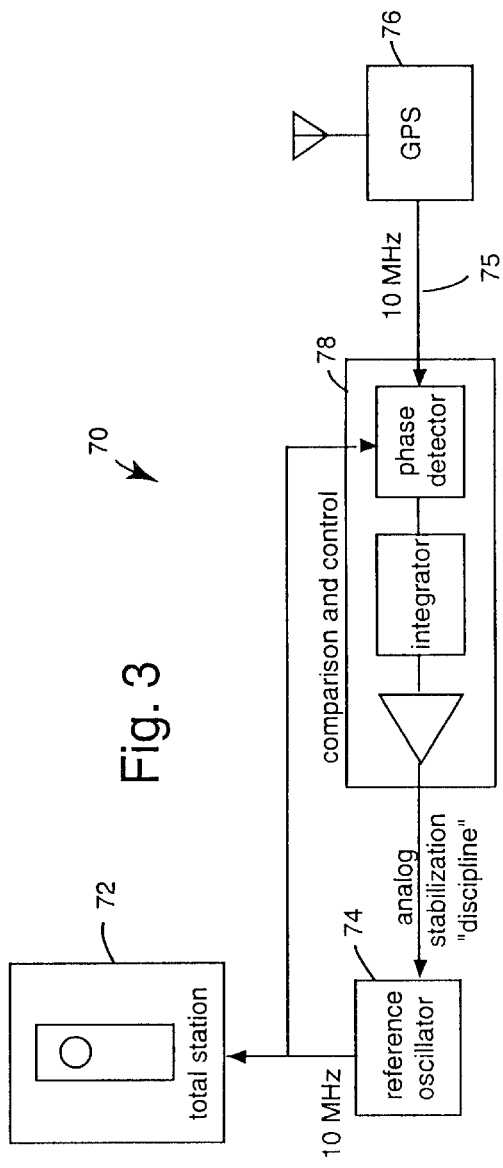
FIG. 3 is a functional block diagram of a total station which uses an external reference oscillator that is stabilized by a timing signal obtained from a GPS receiver.

FIG. 3 illustrates a system 70 in which a total station 72 inputs a 10.00 MHz precision reference oscillator 74 that is stabilized by a timing signal 75 derived from a GPS receiver 76. For example, GPS receivers marketed by Trimble Navigation Limited (Sunnyvale, Calif.) outputs a utility one-pulse-per-second (1PPS) that can be used by a phase comparison and frequency control circuit 78 to make minor corrections in the operating frequency of oscillator 74. Such reference oscillator may be a voltage-controlled oscillator (VCO) or a numeric controlled oscillator (NCO) type. For the VCO type, the control signal from circuit 78 is a variable analog voltage or current. For the NCO type, the control signal from circuit 78 is a digital value.

Figure 4:
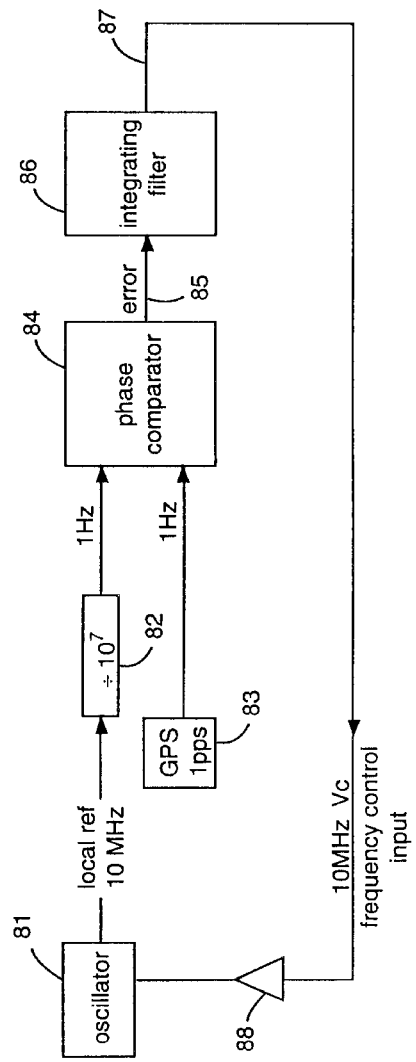
FIG. 4 is a functional block diagram of a 10 MHz reference oscillator in a generic product that is locally stabilized or disciplined by a GPS receiver with zero-crossing comparisons at one pulse per second.

FIG. 4 shows a precision reference system 80 in which a 10.00 MHz reference oscillator 81 is a generic product that is stabilized or disciplined by zero-crossing comparisons at one pulse per second. A divider 82 is used to reduce the output of the oscillator 81 to 1.00 Hz. A local GPS receiver source 83 provides a reference 1.00 Hz signal that is exceedingly precise and stable because it is derived from the atomic clocks used in the GPS system time standards. A phase comparator 84 provides an error signal 85 that is applied to an integrating filter 86 that drives the static phase error to zero for synchronization. A control signal 87 is returned via a buffer 88 to the oscillator 81. The overall effect is to reduce the accumulation of errors over the long term to an average of zero, as in FIG. 2.

Figure 5:
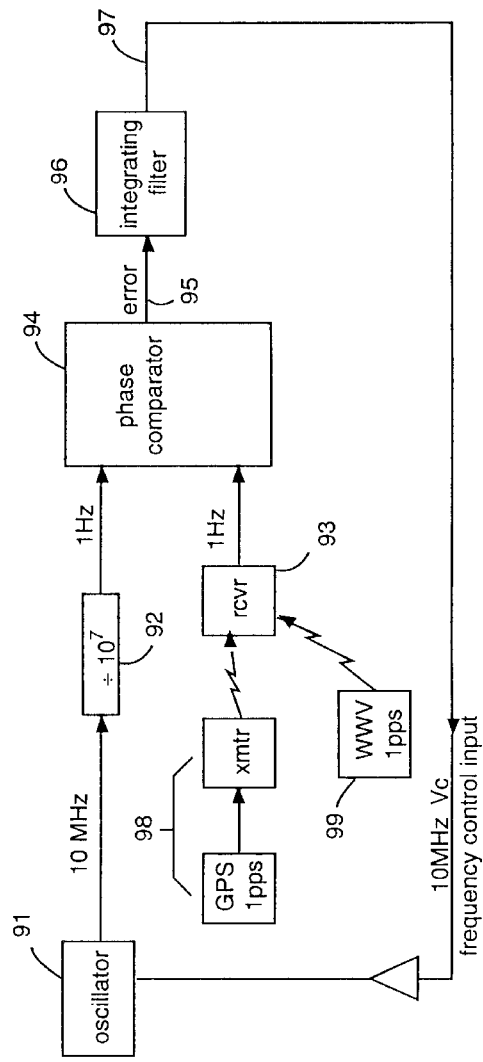
FIG. 5 is a functional block diagram of a 10 MHz reference oscillator in a generic product that is remotely stabilized or disciplined by radio transmissions it receives from either a GPS receiver or government time-standard broadcasts such as from WWV.

FIG. 5 shows an alternative embodiment of a precision reference system 90 in which a 10.00 MHz reference oscillator 91 within an otherwise standard commercial product is stabilized or disciplined, e.g., with one-pulse-per-second signals. A divider 92 reduces the 10.00 MHz output of the oscillator 91 all the way down to 1.00 Hz. A radio receiver 93 is tuned to a 1.00 Hz remotely transmitted signal that is exceedingly precise and stable. A phase comparator 94 provides an error signal 95 that is applied to an integrating filter 96 that drives the static phase error to zero for synchronization. A control signal 97 is returned to closed-loop lock in the frequency of operation of oscillator 91. A GPS receiver and radio transmitter combination 98 or a government time-standard broadcast transmitter 99, e.g., WWV, are examples of sources used by the receiver 93. Such a configuration would be helpful in the total station system 10 of FIG. 1 in areas with intermittent GPS coverage due to tree canopies or urban-canyon effects. For example, receiver 93 could comprise a commercial product such as is marketed by ESE (El Segundo, Calif. 90245), as the ES-180A master clock. The ES-180A receives and synchronizes to time data broadcast from the NIST via short-wave radio, WWV in Fort Collins, Colo., and WWVH in Hawaii, and provides a time-code output (TC89), ASCII time output (queried RS232), and a 1-PPS (pulse-per-second) output.

Time bases that use radio transmissions from the WWV and WWVH stations operated by the United States Government typically provide a usable received accuracy of one part in ten million for frequency, and about one millisecond for timing. The frequencies as transmitted, however, are accurate to one part in a billion because they are based on the primary NIST Frequency Standard and related NIST atomic time scales in Boulder, Colo. The difference in transmitted and received accuracy is due to various propagation effects.

Figure 6:
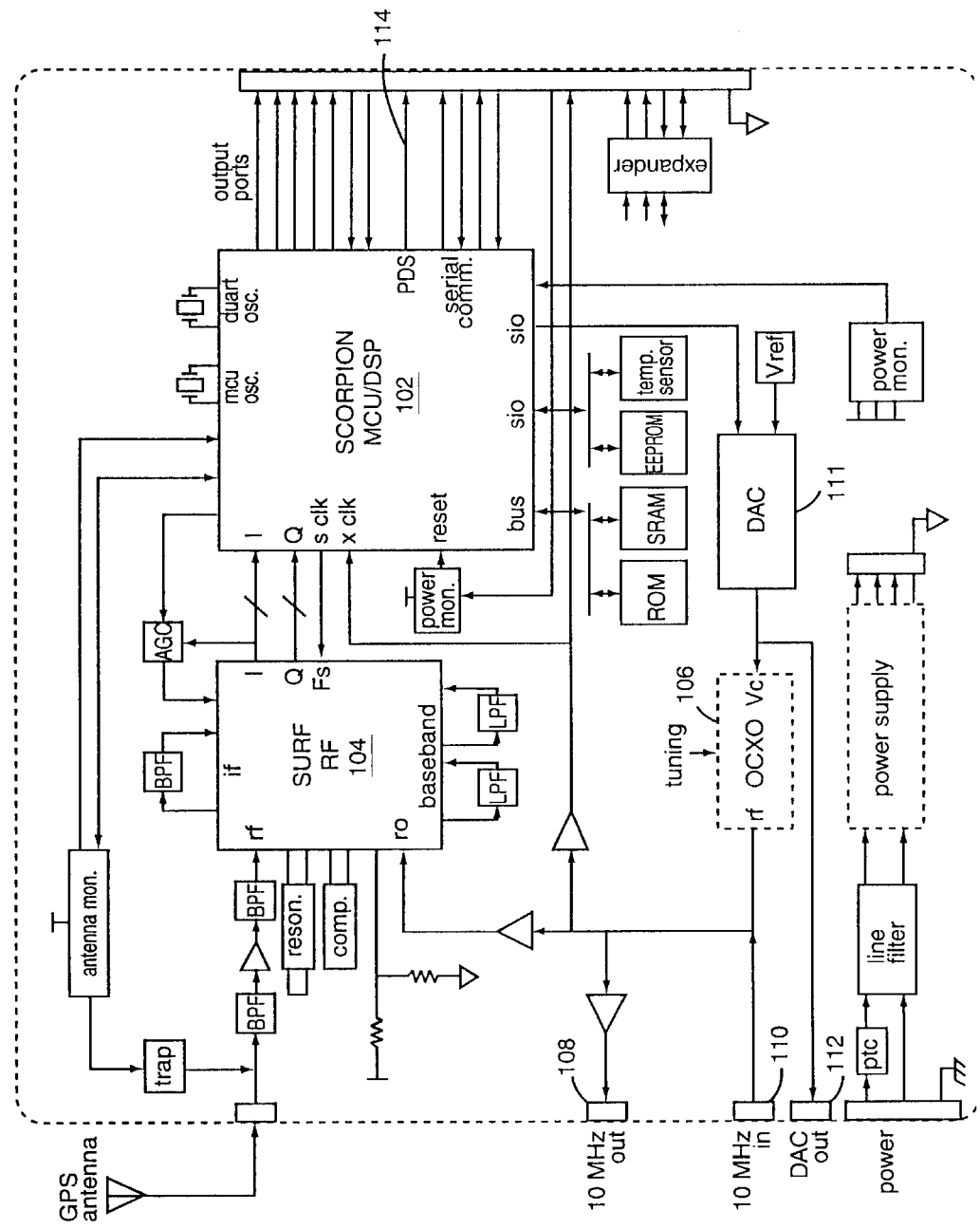
FIG. 6 is a schematic diagram of a GPS receiver useful in the configurations shown in FIGS. 1–3.

FIG. 6 is a schematic diagram of a GPS receiver 100 useful in the configurations shown in FIGS. 1–3. The GPS receiver 100 incorporates a microprocessor control unit (MCU) and digital signal processor (DSP) combination 102, e.g., a "SCORPION" integrated circuit designed by Trimble Navigation Limited (Sunnyvale, Calif.). The radio frequency tuning, downconversion, and digital sampling are done with a radio frequency circuit 104, e.g., a "SURF" integrated circuit designed by Trimble Navigation Limited (Sunnyvale, Calif.). A 10.00 MHz ovenized crystal oscillator (OCXO).106 provides a precision reference frequency output 108 that can be used by the EDM's and total stations described in FIGS. 1–3. Such reference frequency output 108 has very high frequency precision, both short term and long term. Signals from orbiting navigation satellites are used as references and locked on to by tracking loops within the SCORPION 102 and SURF 104 combination. The MCU/DSP 102 samples the OCXO 106 at its XCLK input and the SURF 104 uses an RO input to generate its local oscillator signals. Alternatively, an external 10.00 MHz source maybe connected to input 110. The SCORPION 102 and SURF 104 combination computes frequency errors and controls a digital to analog converter (DAC) 111. A DAC output 112 is then able to discipline the external 10.00 MHz source. A utility 1PPS output 114 is provided that can be used as shown in FIGS. 2 and 3.

Figure 7:
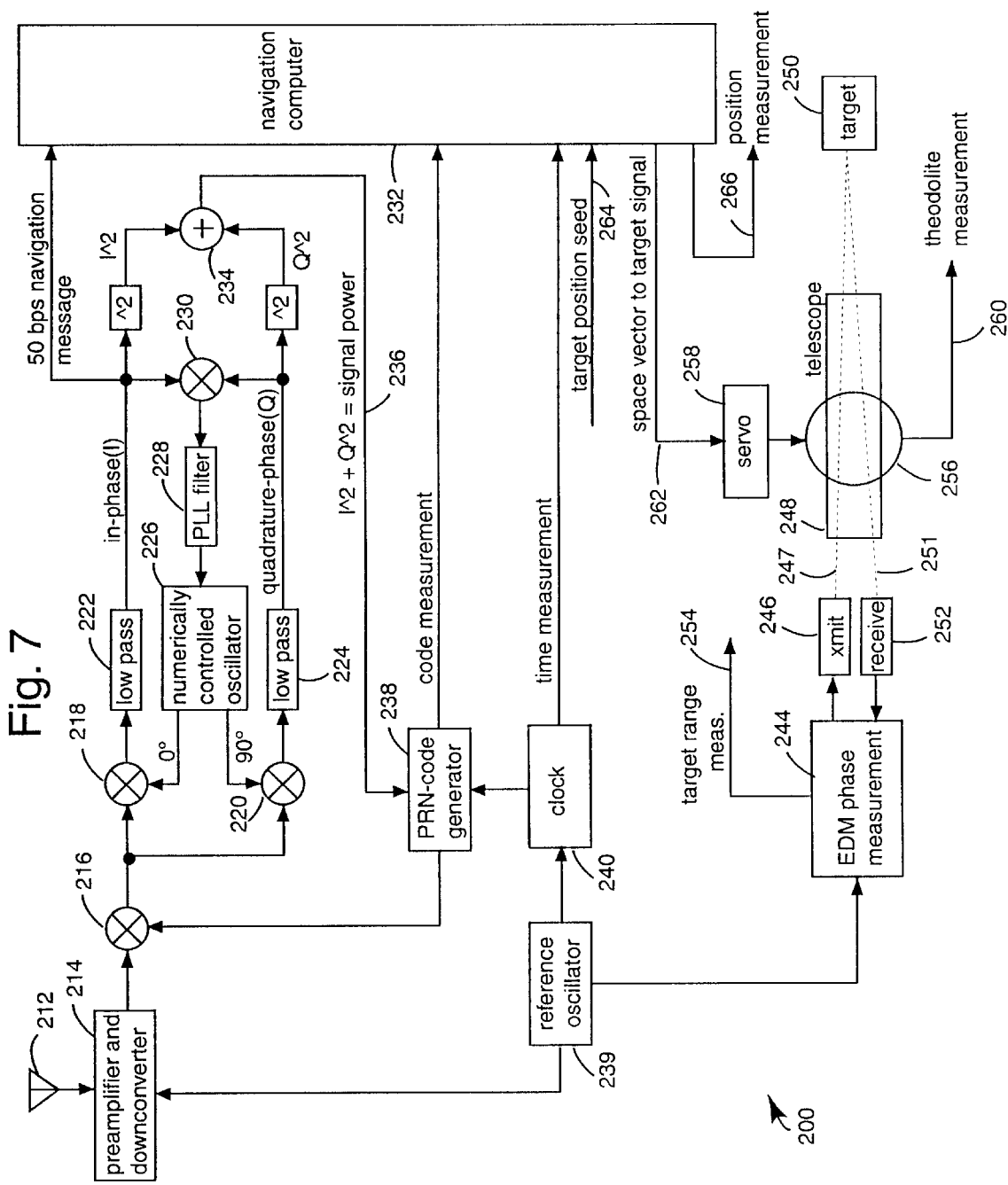
FIG. 7 is a functional block diagram of a combined satellite positioning and electro-optical total station system embodiment of the present invention with software correction.

In FIGS. 1–4, the EDM and GPS oscillator are discussed as being physically distinct and separate units. The GPS oscillator is assumed to be aligned with GPS system time by virtue of its tracking the signals of the visible GPS satellites. But in many GPS receivers, e.g., some of those marketed by Trimble Navigation (Sunnyvale, Calif.), the GPS receiver oscillator is not steered or physically aligned with GPS time. Rather, the clock and frequency offsets are calculated and used later in "software" to arrive at accurate solutions. This software technique is extended in embodiments of the present invention to EDM and other surveying equipment. Such is represented in FIG. 7. As a consequence, such surveying equipment need not be periodically calibrated by a standards laboratory nor certified by government authority. Each measurement in the field is corrected in computer calculations in real-time to approximately the absolute accuracy of the satellite navigation system master clocks. The opportunity for long-term drift to creep in is eliminated as well as the measurement uncertainty that would result.

A system 200 in FIG. 7 is similar to that of FIG. 1, except that the oscillator 43, its control 42, and buffer 41 (all of FIG. 1) are no longer needed. Also the tracking correction from navigation computer 32 to reference oscillator 39 is not used. The navigation computer 32 (232 in FIG. 7) computes the clock and frequency offsets which are used later in "software" to arrive at accurate solutions.

FIG. 7 illustrates a combined satellite positioning and electro-optical total station system embodiment of the present invention, referred to herein by the general reference numeral 200. A global positioning system (GPS) part of the system 200 includes a microwave patch antenna 212 for receiving L-band transmissions from orbiting GPS satellites, a preamplifier and downconverter 214, a code mixer 216, an in-phase carrier mixer 218, and a quadrature phase carrier mixer 220. The carrier mixer outputs are each sent to low pass filters 222 and 224. A numerically controlled oscillator (NCO) 226 is driven by a bi-phase locked loop filter 228 and a multiplier 230. The NCO 226 produces a corrected frequency output that tracks the GPS-satellite carrier being tracked plus any Doppler effects.

The low pass filter 222 produces a fifty Hertz navigation message that is input to a navigation computer 232. An adder 234 combines a squared in-phase signal ($I^2$) and a squared quadrature-phase signal ($Q^2$) to produce a signal-power signal ($I^2+Q^2$) 236 that is proportional in magnitude to the despreading code correlation. The $I^2+Q^2$ signal 236 is used to control the code-phase of a PRN-code generator 238.

A GPS-master reference oscillator 239 provides a precision reference frequency is then made available to drive an EDM phase and measurement device 244. The GPS code measurement, time measurement, and the navigation message are used by the navigation computer 232 to compute the current three-dimensional position of the system 200. Once the location of the instrument station is determined either from GPS or other means, a minimum of only one satellite is required to calibrate the time base of the instrument.

The electronic distance meter (EDM) part of the system 200 includes the EDM phase measurement device 244 connected to a transmitter 246. An out-bound signal 247 is directed through a telescope 248 to a distant target 250. The target 250 may include a prism corner-cube reflector, or active repeater for microwave EDM, to return an in-bound signal 251. The signals 247 and 251 may be infrared or other laser light, or microwave signals. The EDM phase measurement subsystem 244 can conduct either pulse time-of-flight or carrier phase measurements to determine the line-of-sight distance to the target 250. Conventional methods and equipment can be used to do this. A target range measurement 254 is output that can be presented on a local display, recorded electronically, or transmitted to a user that is at the target and is moving the target around to mark a particular range from the system 200 location.

A theodolite part of the system 200 includes the telescope 248 mounted to an angle measurement instrument 256 connected to a servo actuator 258. A theodolite measurement 260 includes an elevation and azimuth output that can be presented on a local display, recorded electronically, or transmitted to a user that is at the target 250 and is moving the target around to mark a particular vector angle from the system 200 location. A space vector to target signal 262 is computed by the navigation computer 232 from a target position seed input 264. The navigation computer 232 is able to compute the current position of the system 200 and outputs this as a position estimate 266.

The clock and frequency offsets that exist in the hardware are corrected for in software of navigation computer 232.

From a position estimate, it is possible to determine the altitude and azimuth vector to the target 250. The space vector to target signal 262 commands the servo 258 to move the telescope 248 so that it is roughly pointed at the target 250. A conventional search and tracking mechanism can then be used to find and keep the target 250 visually locked in. For example, the Geodimeter SYSTEM-500 is a commercially marketed system that is a servo-driven survey instrument in an automatically pointed electro-optical total station. The target location seed can be computed using differential satellite position calculations relative to the EDM reference station.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A surveying instrument comprising:

a satellite navigation receiver with a pulse-per-second output derived from an atomic time standard used in a related orbiting navigation satellite;

a reference oscillator controlled by said pulse-per-second output and providing a reference frequency with a timing accuracy directly related to a timing accuracy of said atomic time standard;

an electronic distance meter having an EDM transmitter for launching an out-bound signal to a distant target and an EDM receiver for receiving a reflected signal from said distant target;

a theodolite with a telescope connected to an angle measurement instrument mechanism that together can automatically locate said distant target and determine an elevation and an azimuth to said distant target;

a phase measurement device connected to the reference oscillator, said EDM transmitter and said EDM receiver, and providing for a time measurement of the difference between said out-bound signal and said reflected signal using said reference frequency; and a navigation computer disposed within the satellite navigation receiver and connected to receive a target-position seed value related to said distant target; and a servo actuator connected to mechanically manipulate the theodolite in azimuth and elevation;

wherein, a distance-to-target measurement is computed with an accuracy dependent on said timing accuracy of said atomic time standard;

wherein, the navigation computer is connected to the servo actuator and provides a signal that will preposition the theodolite; and wherein, the phase measurement device automatically provides a target range measurement to a user at said distance target; and the theodolite automatically provides a vector angle measurement to said user to said distant target.

2. A surveying instrument comprising:

a satellite navigation receiver with a pulse-per-second output derived from an atomic time standard used in a related orbiting navigation satellite;

a reference oscillator controlled by said pulse-per-second output and providing a reference frequency with a timing accuracy directly related to a timing accuracy of said atomic time standard;

an electronic distance meter having an EDM transmitter for launching an out-bound signal to a distant target and an EDM receiver for receiving a reflected signal from said distant target;

a phase measurement device connected to the reference oscillator, said EDM transmitter and said EDM receiver, and providing for a time measurement of the difference between said out-bound signal and said reflected signal using said reference frequency; and wherein, a distance-to-target measurement is computed with an accuracy dependent on said timing accuracy of said atomic time standard; and wherein the satellite navigation receiver is remotely located and communicates via a radio link to the reference oscillator to be adjusted and maintained by a plurality of navigation satellite transmissions received by the satellite navigation receiver.

* * * * *